US008110040B2

(12) United States Patent
Bui (10) Patent No.: US 8,110,040 B2
(45) Date of Patent: Feb. 7, 2012

(54) LIGHTWEIGHT STRUCTURE CONCRETE COMPOSITION

(76) Inventor: Thuan Bui, Philadelphia, PA (US)

(*) Notice: Subject to any disclaimer, the term of this patent is extended or adjusted under 35 U.S.C. 154(b) by 346 days.

(21) Appl. No.: 12/384,349

(22) Filed: Apr. 4, 2009

(65) Prior Publication Data

US 2009/0253831 A1 Oct. 8, 2009

Related U.S. Application Data

(60) Provisional application No. 61/123,128, filed on Apr. 4, 2008.

(51) Int. Cl.
*C04B 14/14* (2006.01)
*C04B 14/16* (2006.01)
*C04B 14/18* (2006.01)
*C04B 24/28* (2006.01)

(52) U.S. Cl. ........ 106/724; 106/675; 106/677; 106/708; 106/709; 106/400; 524/2; 524/8; 524/577

(58) Field of Classification Search .................. 106/724, 106/675, 677, 708, 709, 400; 524/2, 8, 577
See application file for complete search history.

(56) References Cited

U.S. PATENT DOCUMENTS

| 4,341,562 | A | * | 7/1982 | Ahlbeck | 106/707 |
| 4,895,598 | A | * | 1/1990 | Hedberg et al. | 106/694 |
| 4,900,359 | A | | 2/1990 | Gelbman | |
| 5,080,022 | A | | 1/1992 | Carlson | |
| 5,183,505 | A | | 2/1993 | Spinney | |
| 5,185,389 | A | * | 2/1993 | Victor | 524/2 |
| 5,580,378 | A | * | 12/1996 | Shulman | 106/677 |
| 5,759,260 | A | * | 6/1998 | Groh | 106/672 |
| 5,776,243 | A | * | 7/1998 | Goodson et al. | 106/677 |
| 6,488,762 | B1 | | 12/2002 | Shi | |
| 6,881,257 | B2 | | 4/2005 | Beauboeuf | |

* cited by examiner

*Primary Examiner* — Satya Sastri
(74) *Attorney, Agent, or Firm* — Bui Garcia-Zamor; Hung H. Bui, Esq.

(57) ABSTRACT

A lightweight structural concrete is composed of coarse structural aggregate sized between ¼" to ½" occupying 15% to 25% of total concrete volume, large non-structural lightweight aggregate such as expanded polystyrene bead of a particular size distribution and volume amount, small size non-structural lightweight aggregate or entrained air cells of another specific size distribution and volume amount, and a dense cementitious composition comprising cement binder, pozzolan, and fine structural filler no larger than concrete sand ASTM C33.

15 Claims, 9 Drawing Sheets

LIGHTWEIGHT STRUCTURE CONCRETE COMPOSITION

CROSS-REFERENCE TO RELATED APPLICATIONS

This application claims the benefit of earlier U.S. provisional application No. 61/123,128 filed on Apr. 4, 2008 in the U.S. Patent & Trademark Office, the disclosures of which are incorporated by reference herein.

BACKGROUND OF THE INVENTION

1. Field of the Invention

The present invention relates to lightweight concrete with structural strength and, density according to ASTM standard.

2. Description of the Related Art

American Society for Testing and Materials (ASTM) standard defines structural lightweight concrete as having a compression strength in excess of 17.2 MPa (2,500 psi) after 28 days curing when tested in accordance with ATSM C 330, and an air dry density not exceeding 1,842 kg/m$^3$ (115 lb/ft$^3$) as determined by ASTM C 567. Standard concrete mix is made of coarse aggregate (stone), fine aggregate (sand), and cement binder. Similarly to standard concrete mix, many current structural lightweight concrete mixtures have the same mix composition, except that the aggregates in the mix are replaced with lower-density ones. Lower-density replacement aggregates can be of man-made aggregates or natural aggregates, and have compression greater than structural strength of 2,500 psi. For example, most common man-made (synthetic) lightweight aggregates include expanded shale or clay, cinders, and expanded slag. The most common natural lightweight aggregates include pumice, scoria, tuff, and diatomite.

Currently, the use of structural lightweight concrete has been limited to large cast structures where its lower density is required, such as bridges and high rises. Like most normal concrete materials, its utilization in residential buildings has been limited due to its inflexibility, material cost, and associated labor cost in handling the material. Thus, an economical lightweight concrete with structural strength and wood-like properties would be very valuable because it can overcome the limitations of traditional concrete and lightweight structural concrete now used in building applications. This patent application is for such a concrete. To understand the unique teaching disclosed in this patent, it is necessary to understand the common types of concrete matrix of both conventional and lightweight concrete, and their mechanics. In understanding the mechanics of a cellular concrete matrix, we can then design and improve its properties.

Most lightweight concrete (structural or otherwise) falls into three (3) categories. First category of lightweight concrete relates to the standard structural concrete that utilizes lighter aggregates, such as expanded shale or expanded clay as normal stone replacement. The size of lightweight structural aggregates varies from coarse to fine. The mechanics of standard structural concrete matrix work the same way as regular concrete, since the structural aggregates are used to carry the load directly. Second category of lightweight concrete relates to the type of concrete that has no coarse aggregates with structural strength. This concrete is typically provided with fine structural fillers, such as masonry sand and air cells, expanded perlite, vermiculite, or wood particles as the larger non-structural fillers to take up space in the matrix. The concrete matrix in the second category (whether it is cellular or perlite concrete) relies solely on the solid cementitious structure (cement binder and fine structural aggregates such as sand) enveloping the air cells or the expanded perlite to carry the load. Third category of lightweight concrete relates to the type of concrete that has both structural and non-structural aggregates larger than masonry sand; the concrete matrix will have elements of both the first and second categories.

Hereon, the term "structural aggregate" is defined as aggregate that has compression strength that is greater that 2500 psi as consistent with the term "structural" referred in ASTM standard for concrete. The term "non-structural aggregate" is defined as aggregate with compression strength of 2500 psi or less.

In the second category of lightweight concrete, most are cellular concrete, perlite concrete, vermiculite concrete or the like. These types of lightweight concretes are often provided with non-structural strength and are limited in construction applications. Examples of such cellular concrete are disclosed in U.S. Pat. No. 4,900,359 entitled "Cellular concrete"; U.S. Pat. No. 5,183,505 entitled "Cellular concrete"; and U.S. Pat. No. 6,488,762 entitled "Composition of materials for use in cellular lightweight concrete and methods thereof". Examples of such perlite concrete include U.S. Pat. No. 5,080,022 entitled "Composite material and method", and U.S. Pat. No. 6,881,257 entitled "Machinable light weight sisal-based concrete structural building material". A few of the non-structural lightweight concretes can display some very low level of screw-ability and nail-ability, but nothing close to the properties of wood. As a result, the holding strength of screws and grip strength of nails are very poor in comparison to wood. Normally, these types of lightweight concretes tend to crack when screwed or nailed by a user. A few structural lightweight concretes, such as those disclosed in U.S. Pat. No. 5,080,022 and U.S. Pat. No. 6,488,762, may have the desired structural strength but they lack the screw-ability and nail-ability of wood. Moreover, these types of lightweight concretes are not very economical on a large manufacturing scale, because the mixture requires a large amount of expensive cement binder, or has very limited supply of components as in the case of ground recycled glass.

Cellular and non-structural aggregate, such as expanded vermiculite or perlite concrete, has been limited only to a few applications that do not require structural strength, but rather take advantage of the insulating characteristics. Past attempts to make this type of concrete into structural grade and make it more economical have resulted in failure. Such past failures are generally attributable to the lack of understanding of the concrete's matrix and its complex mechanism at the microstructure level. We know that a solid ordinary concrete made of only fly ash, Portland cement and sand, can have compression strength of 8,000-9,000 psi. This strength is much more than the structural requirement of most applications. So, it would make sense to lighten it by introducing effective voids in the concrete. Creating void cells in the concrete matrix with the desirable properties has not been so easy for the last few decades. Developing a viable lightweight structural concrete with the least amount-of material and manufacturing cost is a science. Considering that exotic materials with limited supply required for any concrete mixes or certain complex manufacturing processes will always make the concrete expensive. So in order to be economical material for the industry, the concrete has to be made of common materials and abundant in supply; and its manufacture process must also be simple.

Presently, cellular or non-structural aggregate concretes of second category have only one effective void size distribution. The applicant found that the concrete matrix of this type could be improved by having two void size distributions instead of one. Given the same total effective void volume, the concrete with two void size distributions will always be more stable and have higher strength than the concrete with one void size distribution. The wider spacing between the effective void cells can accommodate more reinforcing fibers. Since coarse aggregate is the cheapest structural filler (component) some amount is needed to make the concrete more affordable only and not functional like in ordinary concrete matrix. The applicant also discovered that by using a combination of absorbent and non-absorbent expanded aggregates one could lower the water to cement ratio of the concrete mix. Further details of the teaching can be ascertained in the Detail Description of the Embodiments sections.

SUMMARY OF THE INVENTION

Several aspects and example embodiments of the present invention provide-a unique lightweight concrete that has structural property and is more economical than regular lightweight structural concrete made with expanded shale. In accordance with an example embodiment of the present invention, there is provided a high strength lightweight concrete comprising: a non-structural lightweight aggregate such as expanded perlite or expanded polystyrene beads, or a combination of expanded perlite and expanded polystyrene bead with average particle size of between 1 mm to 2.5 mm with the narrowest possible size difference between the largest and smallest particles, occupying between 8% to 20% of total concrete volume; another smaller non-structural aggregate like the former or entrained air cells created by an admixture or combination of both with average cell (or effective void) size no larger than 70% of the non-structural filler's average particle size with minimal cell size variance occupying between 6% and 15% of the total concrete volume; coarse structural aggregate sized between ¼" to ½" occupying 15% to 25% of total concrete volume; and a dense cementitious composition comprising of cement binder, pozzolan, fine structural filler such as fine sand, and an optional short fibrillated fiber like PVA occupying the remainder 60% to 72% of total concrete volume. The coarse structural aggregate can be regular crushed or lightweight structural aggregate such as expanded shale or clay. The purpose in having two effective void size distributions in the concrete is to make a more stable structure between the coarse aggregate that is responsible to the concrete strength.

In accordance with another economical embodiment of the present invention, there is provided a high strength lightweight concrete mix comprising: (a) 0.75 to 1.7 part volume of Portland cement or modified Portland cement with shrinkage compensating component such as type K, M, G, or S; (b) 0.00 to 0.80 part volume of fly ash class F or C; (c) 0.75 to 1.5 part volume of fine sand or a fine structural filler of size ho larger than concrete sand ASTM C33; (d) 0.50 to 1.00 part volume of coarse structural aggregate like crushed stone sized between ¼" and ½" to achieve 15% to 25% of total concrete volume; (e) 0.50 to 1.00 part volume of expanded perlite or of expanded polystyrene bead or of a combination of expanded perlite and expanded polystyrene bead with a distribution mean size between 1 mm to 2.5 mm and with at least 75% of the amount of particles falling within ±0.6 mm from center of the mean size, to achieve 8% to 20% of total concrete volume; (f) a predetermined amount of water to achieve cement (W/C) ratio in the range of 0.25 to 0.5; (g) a predetermined amount of a high-range super-plasticizer to reach a desirable slump, workability, or self-consolidating level; (h) a predetermined amount of air entrainment admixture to produce 6% to 15% entrained air with a cell size distribution mean no larger than 70% of size distribution mean of the larger non-structural filler described previously in (e); and (i) optional short fibrillated PVA fiber or other hydrophilic micro-fiber of similar properties occupying 0.01% to 3% of total concrete volume with preferred fiber length of 6 mm to 15 mm.

In addition to the example embodiments and aspects as described above, further aspects and embodiments will be apparent by reference to the drawings and by study of the following descriptions.

BRIEF DESCRIPTION OF THE DRAWINGS

The concrete of the applicant's embodied invention is essentially a concrete with two void size distributions—unlike the ordinary structural concrete with a single void size distribution system. The importance of the two void size distribution system relative to the single void system will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

The present invention relates to a lightweight concrete that has a unique structural matrix with regular or lightweight structural coarse aggregate. For purposes of discussion, the structural property relates to the compression strength of greater than 2,500 psi. As used herein, lightweight means a density that is less than 125 lb/ft$^3$. The unique aspect of the two void size distributions is an important discovery because it allows a more stable and stronger matrix in the concrete relative to other concrete of same density with single void size distribution. Reference will now be made in detail to the types of lightweight concretes, the types of concrete matrixes and their mechanics, and facts that illustrate unique aspect and understanding to the applicant's concrete matrix and mixes. The present embodiment of the present invention, examples of which are illustrated in the accompanying drawings, is referred to throughout. The embodiments are described below in order to explain the present invention by referring to the figures.

Figure 1:
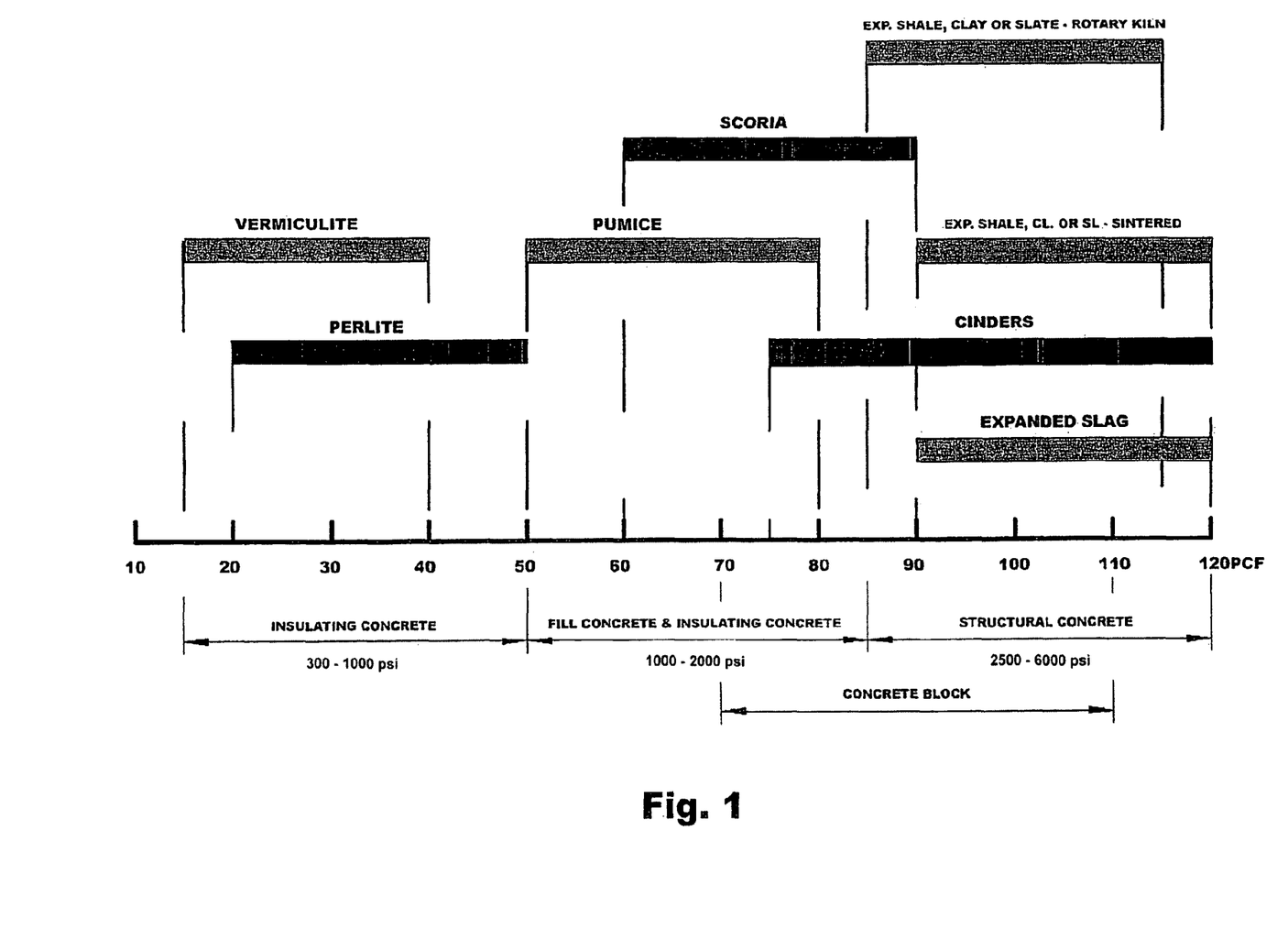
FIG. 1 illustrates currently available lightweight concrete mixes.

FIG. 1 illustrates various conventional lightweight aggregate concrete mixes ranging from non-structural to structural strength, with the typical structural mixes containing structural lightweight aggregate, such as expanded shale, expanded slag, cinders, or expanded clay.

Figure 2:
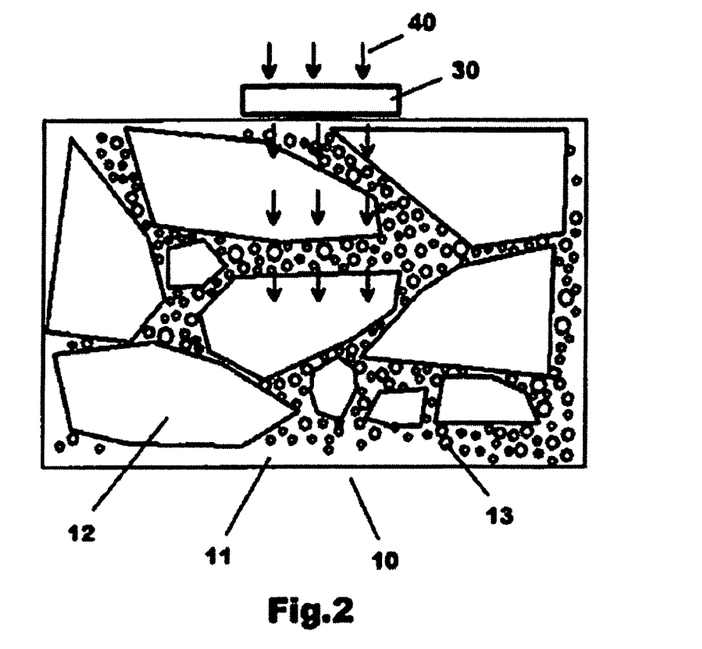
FIG. 2 illustrates the matrix of a standard concrete and its mechanics.

FIG. 2 illustrates typical matrix of a standard concrete and its mechanics. The intention of this figure is to show how the concrete works in carrying its load so as to better understand this aspect of concrete matrix. As shown in FIG. 2, the standard concrete has coarse stone aggregate 12, fine sand aggregate 13, and a composition of cement binder and fly ash 11. The mechanics of this matrix is straightforward. Force vectors 40 from a load starting from above a plate 30 travel a straight downward path through the structural aggregate 12 and through all materials in their path. This is because all the coarse stone aggregate in this matrix have structural strength and are capable of holding up the load. The coarse stone aggregate 12 is usually packed tightly together and the very little space between the coarse aggregate is filled with fine sand 13, cementitious binder 11, and entrained air cells. The entrained air cells usually have a total average air volume of 4% to 5%. The entrained air in this type of concrete is designed to make the concrete more freeze/thaw resistant. Higher volume of entrained air is usually thought to weaken concrete strength. Because the coarse aggregate 12 carries most of the load it plays an important role in providing the concrete strength. The standard lightweight structural concrete with expanded shale has the same concrete matrix as illustrated in this figure. The only difference between them is the density and weight of the coarse aggregate 12. Expanded shale is a lot lighter but more expensive.

Figure 3:
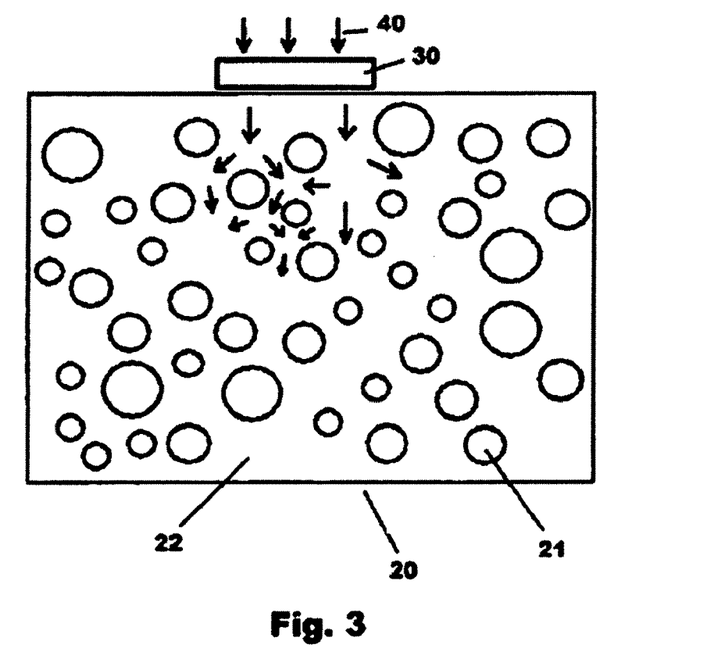
FIG. 3 illustrates the matrix of a cellular concrete and its mechanics.

FIG. 3 illustrates a matrix of a cellular or non-structural filler concrete 20 and its mechanics. This type of concrete matrix works differently from standard concrete. As shown in FIG. 3, the cellular or non-structural filler concrete 20 is provided with non-structural fillers or voids 21 and a solid or cementitious structure 22. The mechanics of this matrix is more complex. Force vectors 40 from a load are distributed and dispersed in different directions within the cementitious structure 22 and travel around the non-structural fillers or voids 21. The vectors 40 interact with one another to hold up the load. In this matrix, the cementitious structural composition 22 does all the work and is often made of a cement binder, such as Portland cement, pozzolan such as fly ash, and fine structural filler such as sand. As the applicant discovered, the design of this solid structure 22 enveloping the non-structural fillers or voids is very important in providing compression strength, screw-ability, and nail-ability of an economic concrete of this type.

Figure 4:
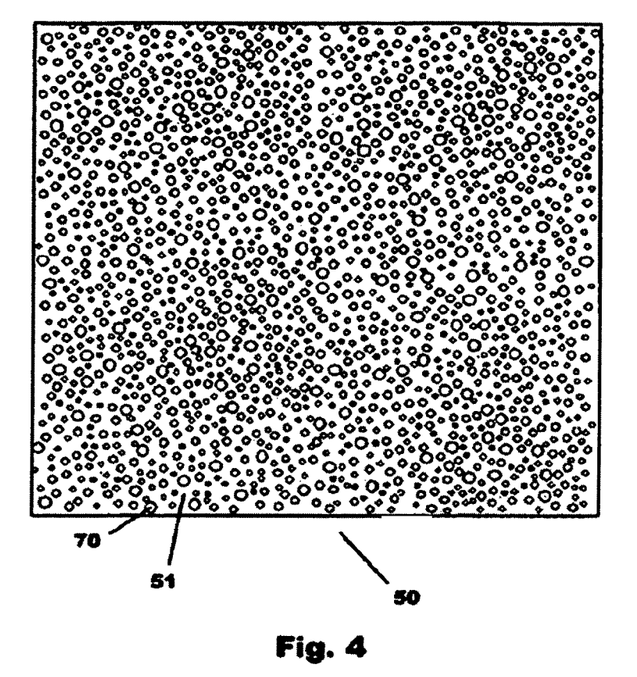
FIG. 4 illustrates the matrix of a typical cellular concrete.
Figure 5:
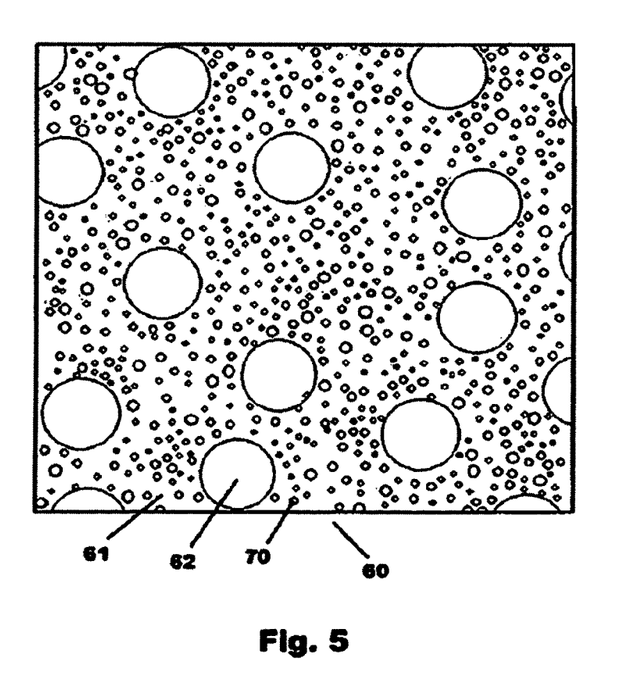
FIG. 5 illustrates an example matrix with two effective void size distributions with the same density and total void volume as in the cellular concrete shown in FIG. 4; This matrix is a more stable than a single void distribution system represented in FIG. 4.

FIG. 4 and FIG. 5 show the difference between the concrete matrix with two effective void size distributions and the single void size distribution matrix of ordinary cellular concrete. FIG. 4 illustrates a typical cellular concrete matrix 50 with 30% total void volume. As shown in FIG. 4, the cellular concrete 50 is also provided with entrained air cells or voids 70 and a solid or cementitious structure 51. However, the air cells or effective voids 70 in the concrete 50 are of a single size distribution. The cementitious composition 51 is composed of Portland cement and fly-ash. In this typical cellular matrix, the space between the cells or voids 70 is very narrow.

Turning now to FIG. 5, an ideal concrete matrix 60 with the same 30% effective total void volume equivalent to the cellular matrix shown in FIG. 4 according to an example embodiment of the present invention is illustrated. The unique aspect of the matrix according to an embodiment of the present invention is that it has two different effective void size distributions: the larger effective void distribution created by non-structural filler 62 can be expanded perlite or expanded polystyrene beads or a combination of expanded perlite and expanded polystyrene bead, and the smaller effective void distribution can be created by an entrained air cell 70 or another non-structural filler. Both the larger effective voids 62 and smaller effective voids 70 each have their own size distribution and amount dispersed throughout the matrix 60. The structural and cementitious composition 61 that envelops both effective voids 70 and 62 is composed of a cement binder, pozzolan, and fine structural filler size no larger than masonry sand. The most important point to notice between this matrix and the typical cellular matrix of equal density is that Applicant's matrix produces a wider cementitious structure between the voids in the concrete matrix 60 and few force vectors. The direction of force vectors within the concrete will also be different with two void size distributions and is suspected to be more parallel to the force vectors exerted by an exterior load.

Figure 6:
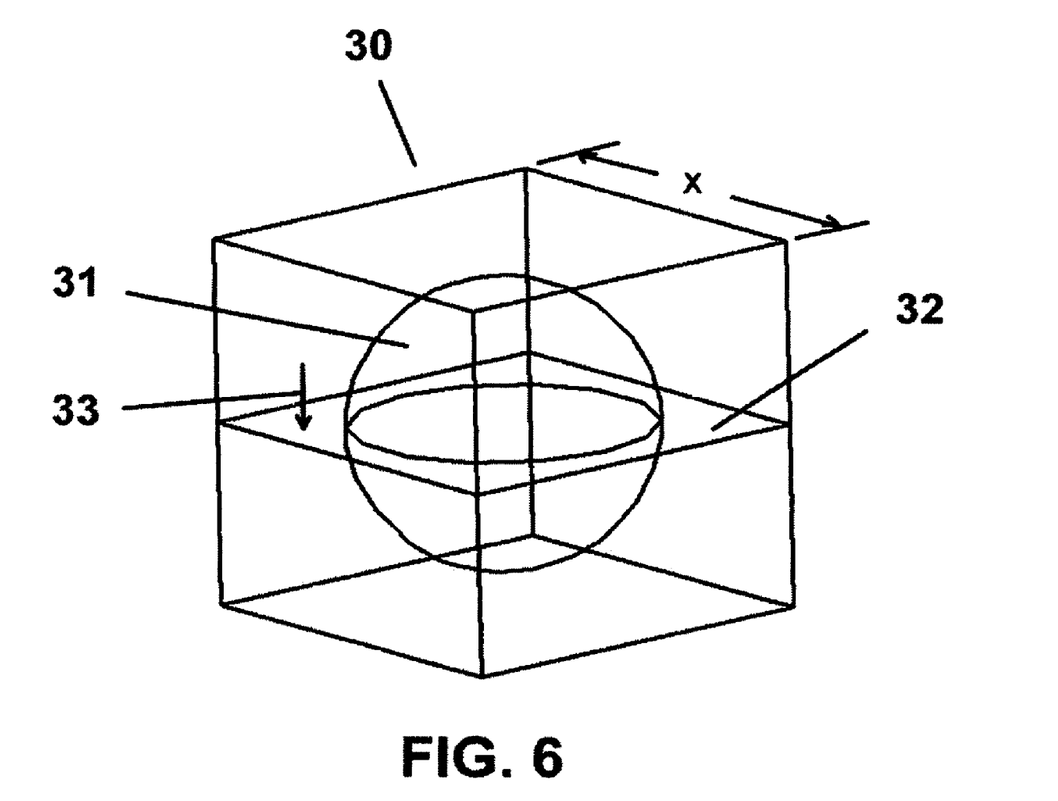
FIG. 6 illustrates a cube of concrete with sphere void in the center.
Figure 7A:
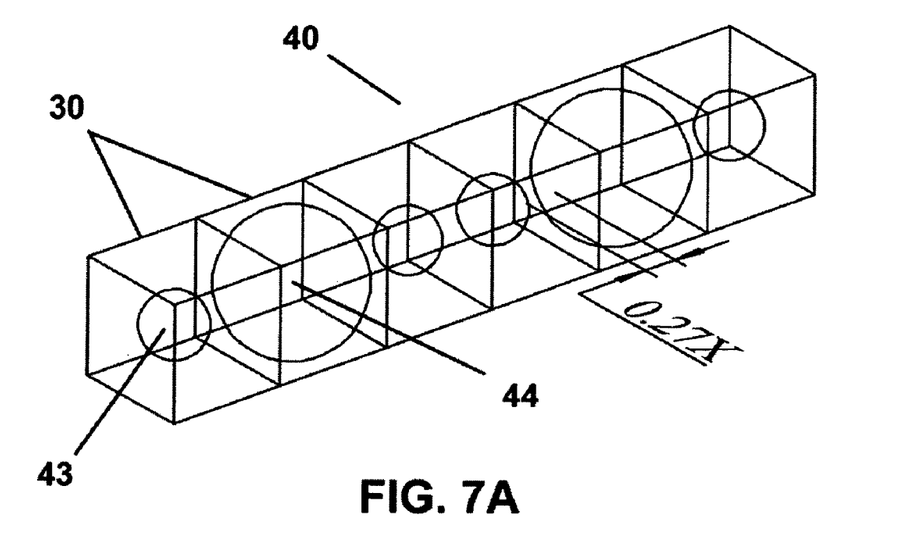
FIG. 7A illustrates many concrete cubes of X dimension assembled into one row, but the voids now are of two sizes and of the same total void volume.
Figure 7B:
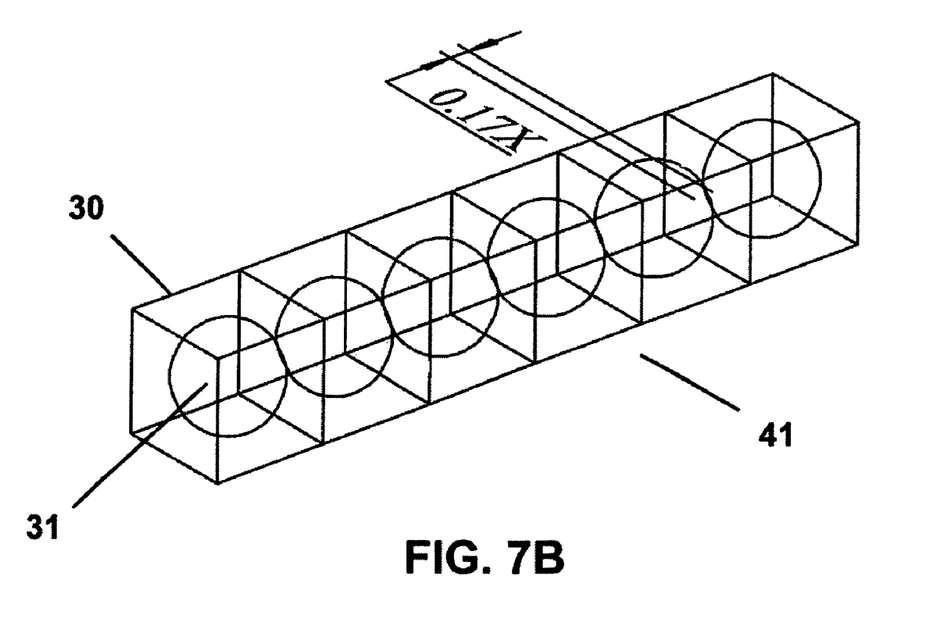
FIG. 7B illustrates many concrete cubes 30 assembled into one row and the spacing between the void cells.

The spacing effect when there are two void size distributions instead of one is an important aspect of the applicant's concrete matrix. The applicant would like to prove this effect in FIG. 6 through FIG. 9. Let's start with a tiny concrete cube 30 shown in FIG. 6. Assume that this concrete cube has (X) dimension and has an air sphere 31 in the center of the cube occupying ⅓ of total concrete volume. Although the concrete is ⅓ lighter, the cross-section area 32 of the cube will be reduced by 58%. The cross-section area loss is much higher than the ⅓ volume loss and is not proportional. The cross-section area 32 is very vital for the strength of the concrete because the force vector travels through it and fine aggregate must fit in it. When one assembles the same concrete cubes in a row, it would look like block 41 shown in FIG. 7B. Also, if one were to assemble other same (X) size cubes with larger and smaller void spheres of equal total volume it would look like block 40 in FIG. 7A. Void sphere 31 is ⅓ of the total cube volume; void sphere 43 is 0.075 of the total cube volume; and void sphere 44 is 0.85 of the total cube volume. The total volume of all spheres 43 and 44 is equal to the total of all void spheres 31. Using the sphere volume formula ($V=4/3\ \pi\ r^3$), the diameter of all spheres can be determined. Now, if one were to measure the spacing between the spheres, one will find that the spacing in block 40 is much wider at approximately 0.27(X). The spacing in block 41 will be at approximately 0.17(X). As one can see the gain in void spacing is approximately 0.10X. The exponential relationship between r and V in $V=4/3\ \pi\ r^3$ plays a very important role in this effect.

Figure 8A:
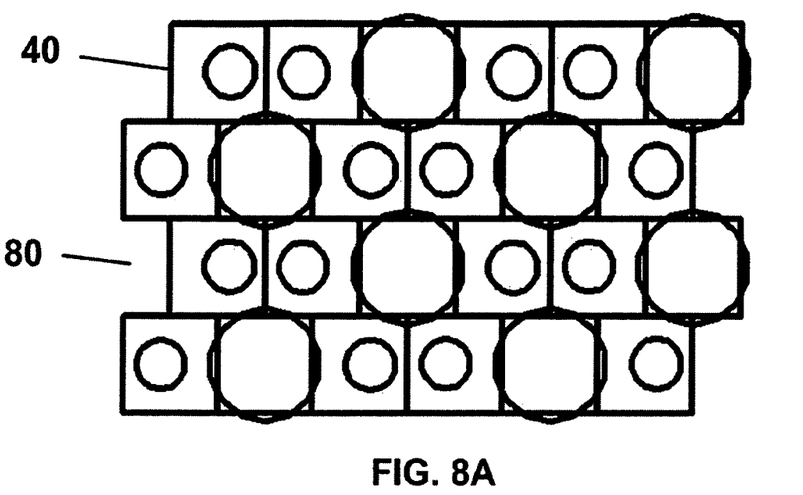
FIG. 8A illustrates the applicant's theoretical concrete matrix 80 made of multiple rows of concrete blocks 40.
Figure 8B:
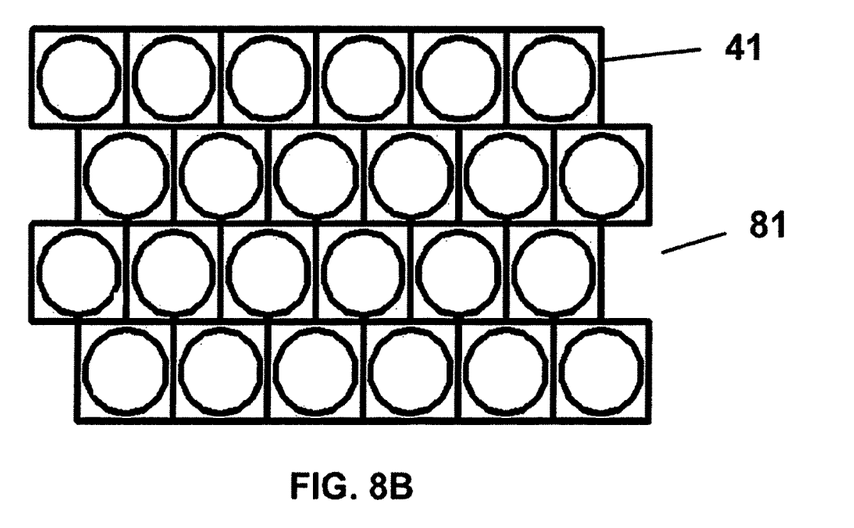
FIG. 8B illustrates a typical cellular concrete matrix 81 made of multiple rows of concrete blocks 41.
Figure 9A:
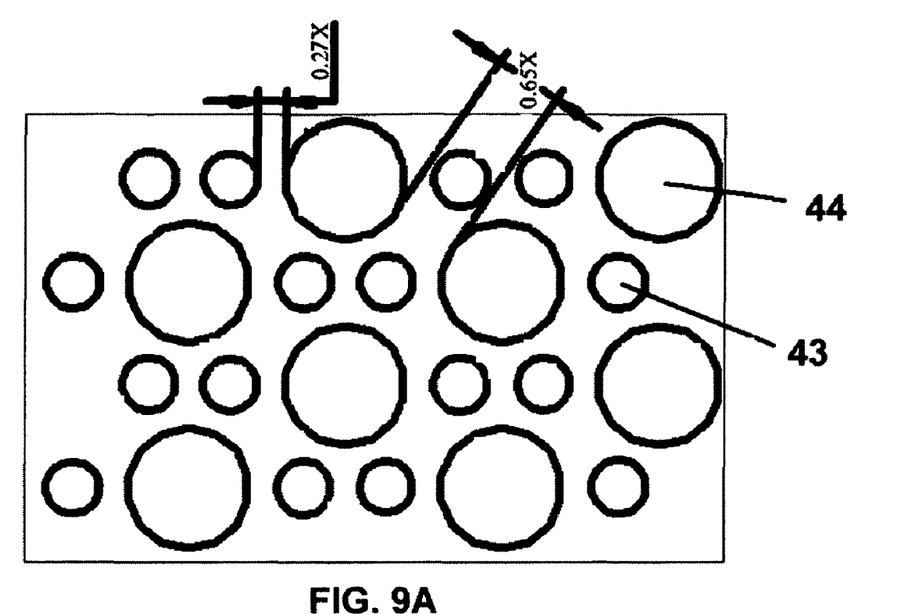
FIG. 9A illustrates the concrete matrix shown in FIG. 8A without lines of concrete cubes so to resemble a real matrix.
Figure 9B:
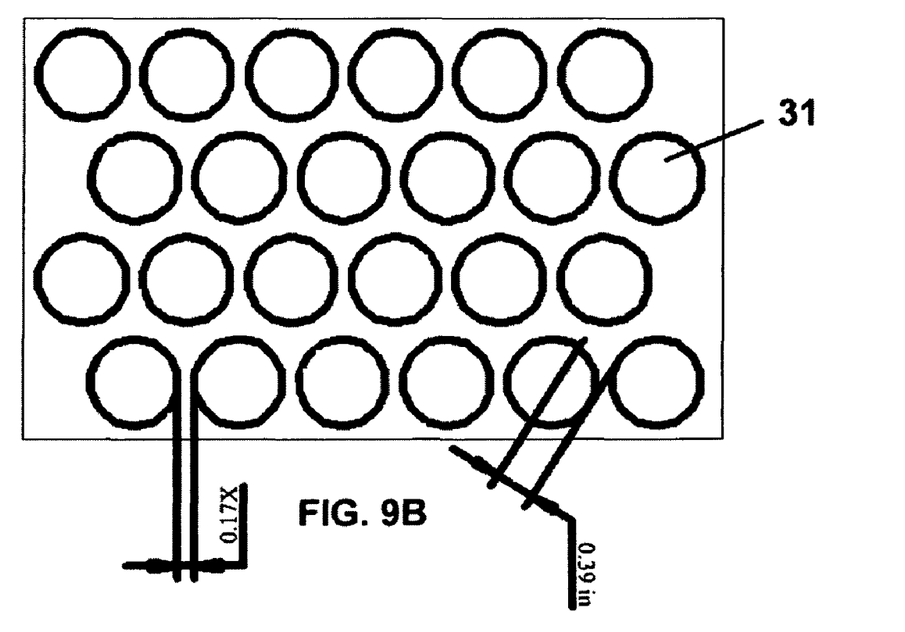
FIG. 9B illustrates the concrete matrix shown in FIG. 8B without lines of concrete cubes so to resemble a real matrix.

Multiple blocks 40 and blocks 41 then can be assembled into planes 80 and 81 as shown in FIG. 8A and FIG. 8B to resemble concrete matrix of the applicant and a cellular concrete. FIG. 9A and FIG. 9B show the same assembly but without the cube's dimensional lines. If one were to stack multiple planes 80 and 81 into a cube, the spacing between void spheres would still remain the same in three dimensions.

Even though both the cellular matrix 50, as shown in FIG. 4, and Applicant's concrete matrix 60, as shown in FIG. 5, have the same total effective void volume in their matrixes and same density, the matrix with two specific effective void distributions of different sizes, as shown in FIG. 5, is more stable, stronger, more water impermeable, and can accommodate more micro fiber than the regular cellular matrix 50 with single void distribution of one size, as shown in FIG. 4. The reason is due to the wider and fewer cementitious structures between all voids of large and small. This can be easily understood if one were to look at the force vectors 40 and the cementitious structure in which the force vectors 40 travel through the cellular matrix 20 as shown in FIG. 3. The wider the cementitious structure is and the fewer force vectors there are, the more stable the matrix structure will have. The wider area between all effective voids also allows more common fine structural fillers like fine sand particles (meeting ASTM C 144 or ASTM C 33 specifications) to fit in as fillers between effective voids and affecting less the cementitious structure's integrity between voids, and less cement is required as a binder. More amounts of short fibrillated micro fibers can also fit more easily in the wider cementitious structure to increase its tensile strength without affecting concrete slump. The wider and denser the cementitious structure separating the effective voids is, the less water permeable the concrete is. As discovered by Applicant, a concrete matrix of the same density as a cellular matrix having a certain amount of larger effective voids created by the non-structural aggregate 62 in the matrix 60 and certain amount of smaller effective voids created by another non-structural filler or air entrained cells 70, as shown in FIG. 5, will cause this widening effect between all effective voids. The wider the structure between voids gets, the stronger and more stable the concrete matrix gets.

Figure 10:
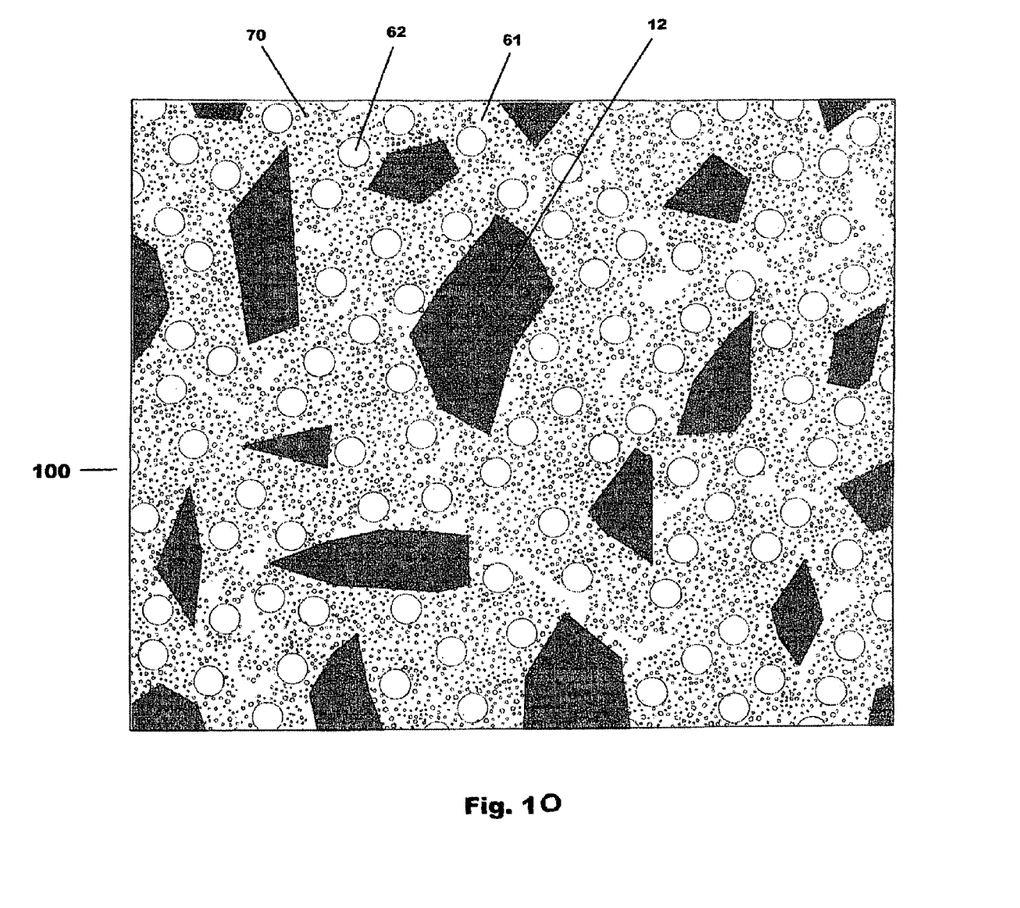
FIG. 10 illustrates an example of the applicant's high strength lightweight concrete with coarse structural filler occupying approximately 25% of total concrete volume.

The applicant's ideal concrete matrix, as shown, for example, in FIG. 10, has two effective void distributions of two different sizes in between the coarse aggregate. In this concrete matrix, the spacing between coarse aggregate is much wider than ordinary concrete. Because of the wide spacing between coarse aggregate, the aggregate becomes less functional and more a space filler. The region between coarse aggregate 12 becomes more important as it has to carry the load. The unique aspect of the applicant's concrete lies in this region. In this region, his concrete has two effective void size distributions unlike other traditional concrete. The larger effective void 62 is non-structural filler, such as expanded perlite, expanded polystyrene bead or a combination of both; the smaller non-structural aggregate is the entrained air cells 70 or another non-structural filler or a combination of both. Cement binder and fine sand composition 61 occupy the majority of the space between the voids. The solid composition 61 is wider and more stable than other concrete with the same density matrix and with a single void size distribution.

Figure 11:
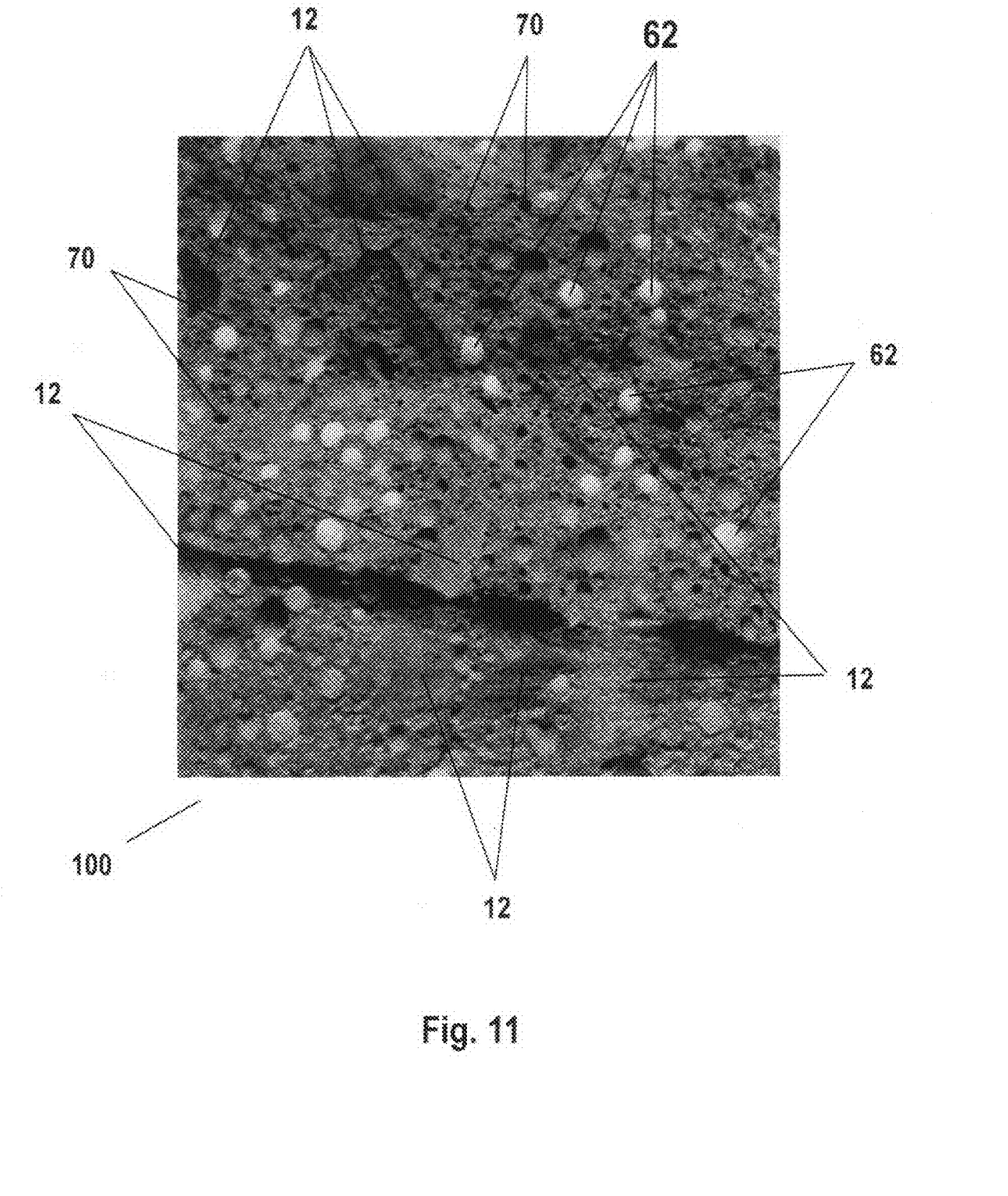
FIG. 11 illustrates an actual concrete matrix of the theoretical concrete matrix shown in FIG. 10.

In an ideal scenario, the size distribution of the large non-structural aggregate and small air cells should have a zero variance. However, in the real life production of expanded perlite or any expanded filler a variance in size always occurs. As a result, at least 75% of the expanded perlite amount in the concrete must be within the range of +/−0.6 mm from the center of the mean size. If the size variance of the non-structural filler is too large, then the concrete matrix will not be consistent or true as defined throughout all sections within the concrete. Similarly, the entrained air cell size distribution must have a mean in the range from microscopic to 0.6 mm with the smallest variance possible. The coarse aggregate 12 is used as a space filler to reduce material cost. The compression strength of the concrete is determined mostly by the solid composition 61 between the effective voids. FIG. 11 shows a picture of the actual applicant's concrete. It shows the limited amount of sized coarse aggregate 12, small voids 70, large voids 62, and a dense cementitious composition 61 made of cement binder and fine sand. The coarse aggregate 12 used for this sample is crushed stone but other lightweight structural lightweight aggregate can be used as alternative.

Applicant has formulated an ideal mix of this matrix using common components that are readily available to make it economical. According to an example embodiment of the present invention, the concrete mixture is composed of:

(1) 0.80 to 1.70 part volume of Portland cement I or III or modified Portland cement with shrinkage-compensating component to make the concrete type G, K, M, or S;

(2) 0.00 to 0.80 part volume of fly ash class F or C;

(3) 0.80 to 1.70 part volume of concrete sand or other fine aggregate no larger than concrete sand ASTM C33;

(4) 0.50 to 1.00 part volume of coarse structural aggregate such as stone or expanded shale sized between ¼" to ½" to achieve 15% to 22% of total concrete volume;

(5) 0.75 to 1.10 part volume of expanded aggregate like expanded perlite or expanded polystyrene beads or combination of expanded perlite and expanded polystyrene bead with the distribution mean size between 1 mm to 2.5 mm with at least 75% of the amount of particles falling within the range of +/−0.6 mm from center of the mean size to produce 8% to 20% of total concrete volume;

(6) 0.50 to 1.20 part volume of water or amount of water to achieve (Water/Cement) weight ratio in the range of 0.25 to 0.5;

(7) Optional short fibrillated PVA fiber or other micro-fiber for reinforcement of its matrix as required for crack control and structural reinforcement in applications where steel mesh is not used, amount of which occupies 0.05% to 2% of concrete volume;

(8) Amount of an air entrainment admixture to produce 6% to 15% entrained air in concrete with average cell size less than 70% of average expanded aggregate size; and (9) Amount of high-range super-plasticizer admixture to achieve a desired slump.

Samples based on this ideal concrete mix were prepared and successfully tested. Various density concrete samples were made with 0.90 to 1.00 part volume of Portland cement type III, 0.28 part volume of fly ash class F. 1.40 part volume of masonry sand, 0.65 part volume of expanded polystyrene bead with 75% of particles falling in between 1.2 mm and 1.8 mm, 1.04 part coarse aggregate (crushed stone sized between ¼" to ⅜", 0.62 to 0.64 part volume of water to achieve 0.32 W/C ratio, 0.0135 part volume of Sikament 6100 (a high range super-plasticizer admixture), 0.00342 to 0.00548 part volume of Sika Air (an air entrainment admixture) depending on the desired total air volume of 8% to 15% in the concrete to achieve certain density. Strength and density results of the samples are shown in the following Table #1.

TABLE #1

| Density (lbs/ft³) | Est. total coarse agg. Vol. | Est. total perlite Vol. | Est. total air Vol. | Total effective void Vol. | Compressive strength in 28 days (psi) |
| --- | --- | --- | --- | --- | --- |
| 101 | 18% | 16.5% | 15.0% | 31.5% | 2700 |
| 106 | 18% | 13.5% | 15.0% | 28.5% | 3300 |
| 112 | 18% | 11.25% | 13% | 24.25% | 4400 |
| 118 | 18% | 11.25% | 8.0% | 19.25% | 5200 |

As previously described, the applicant's novel approach in concrete design is not the conventional replacement of normal-density with low-density structural aggregates and with single void size distribution. Rather, the new concrete design relies on Applicant's discovery and understanding of a new type of concrete matrix: a matrix that has two different but related effective void size distributions with some coarse aggregate of certain size. The size relationship of these two size distributions is extremely important to maintain strength of the cement matrix between effective voids and to lighten the concrete.

As a result, the present invention advantageously provides a unique lightweight concrete. While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended that the present invention not be limited to the various example embodiments disclosed, but that the present invention include all embodiments falling within the scope of the appended claims.

What is claimed is:

1. A high strength lightweight concrete with two effective void size distributions in its matrix comprising:
    (a) an amount of coarse structural aggregate sized between ¼" to ¼" effective to achieve between 15% to 25% of a total concrete volume;
    (b) an amount of large size non-structural aggregate effective to achieve 8% to 20% of the total concrete volume, with a particle size distribution mean between 1 mm to 2.5 mm and with at least 75% of the amount of particles falling within a range of ±0.6 mm from a center of the particle size distribution mean;
    (c) an amount of small size non-structural aggregate effective to achieve 5% to 15% of the total concrete volume, with a particle size distribution mean no larger than 70% of the particle size distribution mean of the large size non-structural aggregate;
    (d) a dense cementitious composition effective to achieve remaining 40% to 50% of the total concrete volume.

2. The high strength lightweight concrete according to claim 1, wherein the large size non-structural aggregate is one of an expanded polystyrene bead, an expanded perlite, or any other lightweight and non-structural aggregate, and wherein the small size non-structural aggregate is entrained air cells.

3. A high strength lightweight concrete mixture comprising:
    (a) 0.80 to 1.70 part volume of Portland cement I, Portland cement III or modified Portland cement with a shrink-compensating component;
    (b) 0.00 to 0.80 part volume of fly ash class F, fly ash class C or pozzolan;
    (c) 0.75 to 1.70 part volume of fine sand or other fine structural filler in accordance with an ASTM C33 specification;
    (d) 0.50 to 1.00 part volume of coarse structural aggregate sized between ¼" to ½" to achieve between 15% to 25% of a total concrete volume;
    (e) 0.50 to 1.00 part volume of expanded polystyrene bead effective to achieve 8% to 20% of the total concrete volume, with a particle size distribution mean between 1 mm to 2.5 mm diameter and with at least 75% of the amount of particles falling within a range of ±0.6 mm from a center of the particle size distribution mean;
    (f) 0.50 to 1.20 volume of water effective to achieve a water-to-cement (W/C) ratio between 0.25 to 0.50;
    (g) an amount of air entrainment mixture effective to achieve 6% to 15% entrained air cells in the concrete mixture with a particle size distribution mean less than 70% of the particle size distribution mean of the expanded polystyrene bead; and
    (h) an amount of super-plasticizer admixture effective to achieve a desired slump within the W/C ratio between 0.25 to 0.50.

4. The high strength lightweight concrete mixture according to claim 3, wherein the coarse structural aggregate is crushed rock or any coarse structural filler sized between ¼" and ½".

5. The high strength lightweight concrete mixture according to claim 3, wherein the coarse structural aggregate is a combination of a water-absorbent aggregate and a non-water-absorbent aggregate, where a ratio of the water-absorbent aggregate to the non-water-absorbent aggregate is adjustable to absorb a specific amount of water out of the concrete mixture before the concrete sets.

6. The high strength lightweight concrete mixture according to claim 3, wherein a waterproofing admixture is added to the concrete mixture to increase water impermeability in the concrete.

7. The high strength lightweight concrete mixture according to claim 3, wherein a fibrillated PVA fiber or other microfiber is added to the concrete mixture for reinforcement.

8. The high strength lightweight concrete mixture according to claim 6, wherein the water-absorbent aggregate is expanded shale and the non-water-absorbent aggregate is crushed rock.

9. The lightweight concrete according to claim 8, further comprising an amount of waterproof admixture effective to reduce both the water vapor and water permeability of the concrete.

10. A lightweight concrete mixture comprising: 1.05 to 1.75 part volume of Portland cement; 0.00 to 0.80 part volume of fly ash; 0.75 to 1.70 part volume of fine sand; 0.50 to 1.00 part volume of coarse structural aggregate effective to achieve 15% to 25% of a total concrete volume;
    0.50 to 1.00 part volume of expanded polystyrene bead effective to achieve 8% to 20% of the total concrete volume, with a particle size distribution mean between 1 mm to 2.5 mm in diameter and with at least 75% of particles falling within a range of ±0.6 mm from a center of the particle size distribution mean;
    0.50 to 1.20 part volume of water effective to achieve a water-to-cement (W/C) ratio between 0.25 to 0.50;
    an amount of air entrainment admixture effective to achieve 6% to 15% entrained air cells in the concrete mixture, with a particle size distribution mean less than 70% of the particle size distribution mean of the expanded polystyrene bead in the concrete mixture; and
    an amount of super-plasticizer admixture effective to achieve a desired slump within the W/C ratio between 0.25 to 0.50.

11. The lightweight concrete mixture according to claim 10, further comprising an amount of waterproof admixture effective to reduce water vapor and water permeability of the concrete mixture.

12. The lightweight concrete mixture according to claim 10, wherein an expanded perlite is added to the expanded polystyrene bead and a ratio of the expanded perlite relative to the expanded polystyrene bead is adjustable to absorb water amount out of the wet concrete mixture before the concrete sets.

13. The lightweight concrete mixture according to claim 10, wherein the entrained air cells in the concrete mixture can be partially substituted by any lightweight aggregate having a compression strength less than 2500 psi or expanded polystyrene bead having the same size as the entrained air cell size.

14. The lightweight concrete mixture according to claim 10, wherein a waterproofing admixture is added to the concrete mixture to increase water impermeability in the concrete.

15. The lightweight concrete mixture according to claim 10, wherein a fibrillated PVA fiber or other micro-fiber is added to the concrete mixture for reinforcement.

\* \* \* \* \*